(12) United States Patent
Shah et al.

(10) Patent No.: US 10,666,667 B2
(45) Date of Patent: May 26, 2020

(54) SYSTEM AND METHOD FOR CONDUCTING A SECURED COMPUTER BASED CANDIDATE ASSESSMENT

(71) Applicant: Tata Consultancy Services Limited, Mumbai (IN)

(72) Inventors: Viral Prakash Shah, Mumbai (IN); Shobhit Shukla, Mumbai (IN); Rishi Setiya, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 218 days.

(21) Appl. No.: 15/874,020

(22) Filed: Jan. 18, 2018

(65) Prior Publication Data

US 2019/0132338 A1 May 2, 2019

(30) Foreign Application Priority Data

Nov. 2, 2017 (IN) .............................. 201721039095

(51) Int. Cl.
*H04L 29/06* (2006.01)
*G06F 9/445* (2018.01)
(Continued)

(52) U.S. Cl.
CPC ...... *H04L 63/1416* (2013.01); *G06F 9/44505* (2013.01); *G09B 7/02* (2013.01);
(Continued)

(58) Field of Classification Search
CPC ......... G06F 9/44505; G09B 7/02; G09B 7/06; H04L 63/0861; H04L 63/1416; H04L 63/1441
See application file for complete search history.

(56) References Cited

U.S. PATENT DOCUMENTS 6,643,777 B1 * 11/2003 Chu ...................... G06F 21/71
726/16
9,959,777 B2 * 5/2018 Breed ................ G02B 27/0172
(Continued)

FOREIGN PATENT DOCUMENTS

CN 102880781 1/2013
WO WO-2008/030993 3/2008

*Primary Examiner* — Trang T Doan
(74) *Attorney, Agent, or Firm* — Finnegan, Henderson, Farabow, Garrett & Dunner LLP (57) ABSTRACT

A system and method for conducting a computer based candidate assessment in an examination center has been described. The system primarily involves a candidate assessment device in communication with the computer. The candidate assessment device further comprises an operating system and an assessment application. The candidate assessment device captures the proctoring data of the candidate during assessment. The system also includes plurality of sensors including camera and biometric sensor. The biometric data captured from biometric sensor is used to authenticate the identity of the candidate using the UIDAI database. The system also includes an external communication device to sniff a plurality of external communication within vicinity of the candidate. Further, the proctoring data is provided to an assessment server. And assessment server raise an alarm if one of a predefined suspicious activity is detected.

15 Claims, 4 Drawing Sheets

(51) Int. Cl.
*G09B 7/06* (2006.01)
*G09B 7/02* (2006.01)

(52) U.S. Cl.
CPC ............ *G09B 7/06* (2013.01); *H04L 63/0861* (2013.01); *H04L 63/1441* (2013.01)

(56) References Cited

U.S. PATENT DOCUMENTS

| | | | |
|---|---|---|---|
| 2011/0223576 A1* | 9/2011 | Foster | G09B 7/02 |
| | | | 434/362 |
| 2012/0176220 A1* | 7/2012 | Garcia | G06F 21/32 |
| | | | 340/5.83 |
| 2015/0188838 A1 | 7/2015 | Bhattacharya et al. | |
| 2016/0306617 A1* | 10/2016 | Riedisser | G06F 8/65 |
| 2018/0131518 A1* | 5/2018 | Scicchitano | G07C 9/37 |
| 2018/0225457 A1* | 8/2018 | Barsness | G06F 21/35 |
| 2019/0268155 A1* | 8/2019 | Guo | H04W 12/1206 |

\* cited by examiner

SYSTEM AND METHOD FOR CONDUCTING A SECURED COMPUTER BASED CANDIDATE ASSESSMENT

PRIORITY CLAIM

This U.S. patent application claims priority under 35 U.S.C. § 119 to India Application No. 201721039095, filed on Nov. 2, 2017. The entire contents of the abovementioned application are incorporated herein by reference.

TECHNICAL FIELD

The embodiments herein generally relates to the field of computer based assessment of candidates, and, more particularly, to a method and system for conducting a secure computer based assessment of candidates at an examination center.

BACKGROUND

The digitization of assessment starting from setting up of questions papers, candidate booking to a test center, mode of assessment and the marking technique has brought revolutionary changes in the education domain. Due to added cost and complexity of traditional paper based assessments, computer based assessments, typically referred to as online assessments, have emerged as a popular and convenient method for administering and processing the assessments. For example, assessments that are conducted at a large scale, such as GRE, GMAT, SAT, TOEFL, LSAT, CAT, AIEEE, and other similar assessments that require more time and efforts in administration and processing, are now conducted online. The process of conducting assessment also includes arrangement of assessment centers with computers and most of the centers belong to third party contractual vendors.

The general acceptability of computer based assessments in academic as well as corporate sectors is mostly due to ease of use and reduced time and effort in conduction and evaluation of the assessments. However, there are few issues also coming up along with the advancement in computer based assessment techniques. Such as the use of untraceable medium such as mobile phones, Bluetooth devices, virus, malwares, impersonators, remote screen sharing, KVM switches, cordless phones, pager etc. are difficult to be detected at assessment centers. The number of usable computers are very less as compared to the candidates appearing for the assessment at the same time. Therefore the increased use of online assessment has given rise to a number of issues related to security and integrity of the assessment. Maintaining integrity of the assessment becomes even more burdensome when the assessment is conducted at a large scale at several distributed examination centers.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for conducting a candidate assessment. The system comprises a computer, an operating system, an input/output interface, a candidate assessment device, an external communication detection device, blocking module, an assessment server and an alarm. The computer is to be used by the candidate for the assessment. The operating system is installed on the computer, wherein the operating system enabled with a plurality of security features for candidate assessment. The input/output interface provides an assessment set on the computer, wherein the assessment set is to be used for the assessment of the candidate. The candidate assessment device in communication with the computer, wherein the candidate assessment device is configured to capture the proctoring data of the candidate either at a predefined intervals or random intervals. The external communication detection device sniffs a plurality of external communication within vicinity of the candidate during the assessment of the candidate. The blocking module present in the computer, wherein the blocking module is configured to block the use of a plurality of external hardware devices except a mouse and a keyboard using the assessment application. The assessment server communicatively coupled to the candidate assessment device, wherein the assessment server is configured to receive the proctoring data and the behavior of the candidate. The alarm in communication with the assessment server, wherein the alarm is raised if one or more of a predefined activity is detected.

In another aspect the embodiment here provides a method for conducting a computer based candidate assessment. Initially, an operating system is installed on a candidate assessment device, wherein the candidate assessment device is in communication with the computer and the operating system enabled with a plurality of security features for candidate assessment. In the next step, an assessment set is provided on the computer, wherein the assessment set is to be used for the assessment of the candidate. Further a proctoring data of the candidate is captured by the candidate assessment device either at a predefined or a random intervals during the assessment. At the same time, a plurality of external communication within vicinity of the candidate is also sniffed using an external communication detection device during the assessment of the candidate. In the next step, the use of a plurality of external hardware devices except a mouse and a keyboard is blocked using an assessment application. In the next step, the proctoring data is transmitted to an assessment server communicatively coupled to the candidate assessment device. And finally, an alarm is raised by the assessment server if one or more of a set of predefined activity is detected.

In another aspect the embodiment here provides a non-transitory computer readable medium storing one or more instructions which when executed by a processor on a system, cause the processor to perform method for conducting a computer based candidate assessment. Initially, an operating system is installed on a candidate assessment device, wherein the candidate assessment device is in communication with the computer and the operating system enabled with a plurality of security features for candidate assessment. In the next step, an assessment set is provided on the computer, wherein the assessment set is to be used for the assessment of the candidate. Further a proctoring data of the candidate is captured by the candidate assessment device either at a predefined or a random intervals during the assessment. At the same time, a plurality of external communication within vicinity of the candidate is also sniffed using an external communication detection device during the assessment of the candidate. In the next step, the use of a plurality of external hardware devices except a mouse and a keyboard is blocked using an assessment application. In the next step, the proctoring data is transmitted to an assessment server communicatively coupled to the candidate assessment device. And finally, an alarm is raised by the assessment server if one or more of a set of predefined activity is detected.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIG. 1 through FIG. 3A-3B, where similar reference characters denote corresponding features consistently throughout the figures, there are shown preferred embodiments and these embodiments are described in the context of the following exemplary system and/or method.

Figure 1:
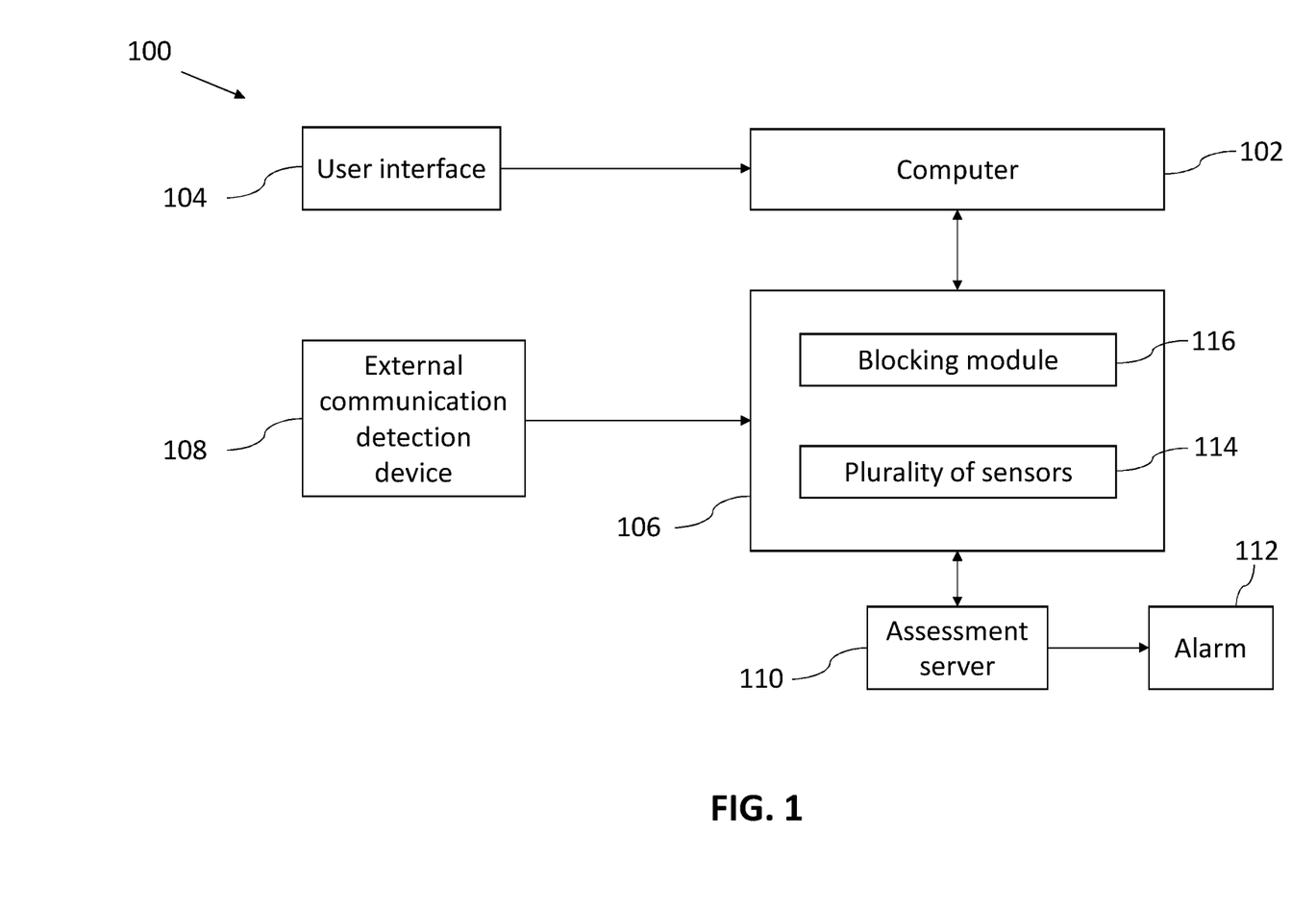
FIG. 1 illustrates a block diagram for conducting a secure computer based assessment of candidates at an examination center according to an embodiment of the present disclosure.

According to an embodiment of the disclosure, a system 100 for conducting a secure computer based assessment of a candidate at an examination center is shown in FIG. 1. The system 100 provides a hassle free and unified experience in digital assessment and onscreen marking. The system 100 prevents internal interventions and detect any interfering external communication within its vicinity during the assessment of the candidate. In addition to that the system 100 can be self-controlled from a central administrative server to perform certain system level task that will not be accessible by the end user.

According to an embodiment of the disclosure, the system 100 is configured to be used in an examination center. Generally the examination center comprises a plurality of computers or laptops for conducting the assessment of one or more candidates. It is mandatory to maintain the integrity and security of assessment in such kind of conditions. For the purpose of description in this disclosure, the system 100 is explained in coordination with one computer 102. The system 100 further comprises an input/output interface 104, a candidate assessment device 106, an external communication detection device 108, an assessment server 110 and an alarm 112 as shown in the block diagram of FIG. 1.

According to an embodiment of the disclosure the input/output interface 104 is configured to provide a plurality of inputs to the computer 102. The input/output interface 104 is configured to provide an assessment set on the computer 102. The assessment set is to be used for the assessment of the candidate. The assessment set may include different types of question set such as optional, multiple choice, comprehension, fill in the blanks, match the columns and programming test containing text, images, audio, video content. The input/output interface 104 is also configured to take response in different formats such as text, audio/video recording for the question. The input/output interface 104 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

Figure 2:
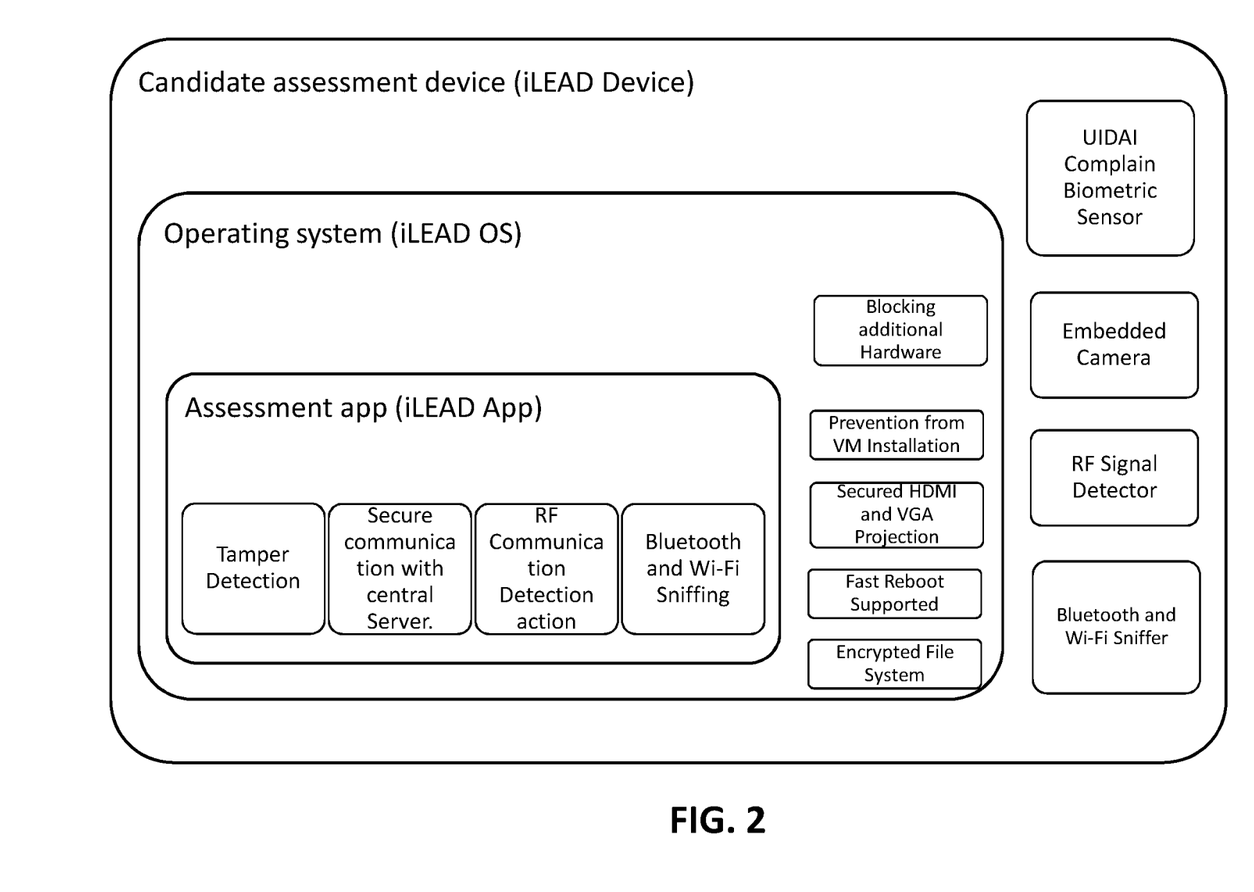
FIG. 2 shows a schematic architectural view of the system according to an embodiment of the disclosure.

According to an embodiment of the disclosure, the system 100 further includes the candidate assessment device 106 as shown in schematic architecture of FIG. 2. It should be appreciated that the candidate assessment device 106 may also be referred as an "iLEON Device" 106. The candidate assessment device 106 is a battery operated device. The candidate assessment device 106 is configured to capture the proctoring data of the candidate either at a predefined intervals or a random intervals during the assessment. The predefined interval can be chosen by the administrator based on the length of the assessment and other factors. In an example, the intervals can be random intervals randomly chosen by the system. In another example, the proctoring data can be captured at various time intervals, such as at the beginning of the assessment, at check-out for breaks, at check-in from breaks, and at the end of an examination.

The candidate assessment device 106 may include a plurality of sensors 114 for assessing the behavior of the candidate. The plurality of sensors may include, but not limited to, a camera, a plurality of biometric sensors such as an iris scanner, a finger print sensor, sound sensitive recorder etc. The plurality of sensors 114 either may be in-built to the candidate assessment device 106 or can be connected externally to the candidate assessment device 106.

According to an embodiment of the disclosure, the camera is configured to capture the candidate's image once before the beginning of the examination. Thereafter, the camera captures the image of the candidate either at the predefined time intervals or the random intervals during the examination. In an implementation, the camera is configured to compare the captured still image during the examination with pre-stored still image taken from unique identification authority of India (UIDAI) database. The system 100 is capable to perform facial recognition by comparing the captured image with the image present in the UIDAI database. This helps to have the proof that there was no impersonation and malpractice during the period of examination.

The candidate assessment device 106 is compliant with the unique identification authority of India (UIDAI) database. The candidate assessment device 106 includes the plurality of biometric sensors. The data taken from the biometric sensor can further be used to authenticate and validate the candidate identity during assessment. In another example, the login of the candidate will only be possible on successful verification of the candidate using the UIDAI database. According to another embodiment of the disclosure, the candidate needs to be registered in the system 100 before the start of the candidate assessment. During registration, the candidate needs to submit his/her biometric details, which can further be used to verify the identity of the candidate using UIDAI database.

According to an embodiment of the disclosure, the candidate assessment device 106 is installed with an operating system as shown in schematic architecture of FIG. 2. In an example of the disclosure, the operating system can be an "iLEON OS". The operating system is a fully loaded operating system with customized Linux to enable the required security for assessments and on screen marking and also supports quick reboot time to optimize operation task. The operating system is enabled with a plurality of security features for candidate assessment. The operating system is secured from HDMI and VGA projection to prevent disclosure of the content by any unfair means. It is also embedded with a unique secure package auto upgrade functionality that prevents any new software installation. Moreover, the operating system is also provided with the feature of encrypted file systems. Moreover, the operating system also prevents itself to become a virtual machine. Virtual machine is nothing but the installation of operating system on a software with different base operating system. Thus, all the operating system control will be applied to virtual environment. Thus, we the present disclosure preventing the "iLEON OS" to became a virtual machine. Moreover, the operating system also supports the data rebooting.

According to an embodiment of the disclosure, the candidate assessment device 106 also includes the assessment application as shown in schematic architecture of FIG. 2. In an example of the disclosure, the assessment application is "iLEON App". The assessment application works in coordination with the candidate assessment device 106 and the operating system. The assessment application works as a watchdog for assessment and tracks candidate behavior during assessment and alerts the assessment server 110 or any other central monitoring body in case of any malpractices. The assessment application also sends command to capture photo of the candidate using the camera present on the candidate assessment device 106. The assessment app also includes a module for tamper detection.

According to an embodiment of the disclosure, the system 100 also includes the external communication detection device 108. The external communication detection device 108 is configured to sniff a plurality of external communication within vicinity of the candidate during the assessment of the candidate. In an example, the external communication detection device 108 is configured to perform radiofrequency/mobile communication detection, a Bluetooth signal detection and a Wi-Fi communication detection within the vicinity of the candidate. Further, radiofrequency communication detection includes 2G, 3G and 4G spectrum and expandable to support future generation of communication. Though it should be appreciated that the external communication detection device 108 can also be designed to sniff any other form of communication.

According to an embodiment of the disclosure, the system 100 further comprises a blocking module 116 present in the operating system. The blocking module 116 is configured to block the use of a plurality of external hardware devices except a mouse and a keyboard. The blocking module 116 works in conjunction with the assessment application.

According to an embodiment of the disclosure, the system 100 further includes the assessment server 110 and the alarm 112. The assessment server 110 is in communication with the candidate assessment device 106. The alarm 112 is in communication with the assessment server 110. It should be appreciated that the assessment server 110 is a central assessment server connected centrally to various examination centers. It should also be appreciated that the assessment server 110 may also be a local assessment server present at the examination center. The assessment server 110 is configured to receive the proctoring data and the behavior of the candidate as an input. The assessment server 110 is further configured to raise the alarm 112 if one or more of a predefined activity is detected.

The predefined activities may include, but not limited to at least one of an external communication out of the plurality of external communications within vicinity of the candidate, an unusual behavior of the candidate as detected by the assessment application, the presence of additional hardware connected to the computer, improper matching of the proctoring data with an initial registration data, wherein the initial registration data is the data of the candidate captured before the start of the assessment.

According to an embodiment of the disclosure, the assessment server 110 can also be send the alert signal back to the invigilator to stop the candidate assessment in case any predefined activity is detected. In another example, the assessment server 110 can automatically pausing the candidate assessment if any of the predefined activity is detected. The candidate assessment can be resumed by the invigilator only if the invigilator is satisfied that there is no breach. In case of breach of any one of the predefined activity, then the assessment can be stopped.

Figure 3A:
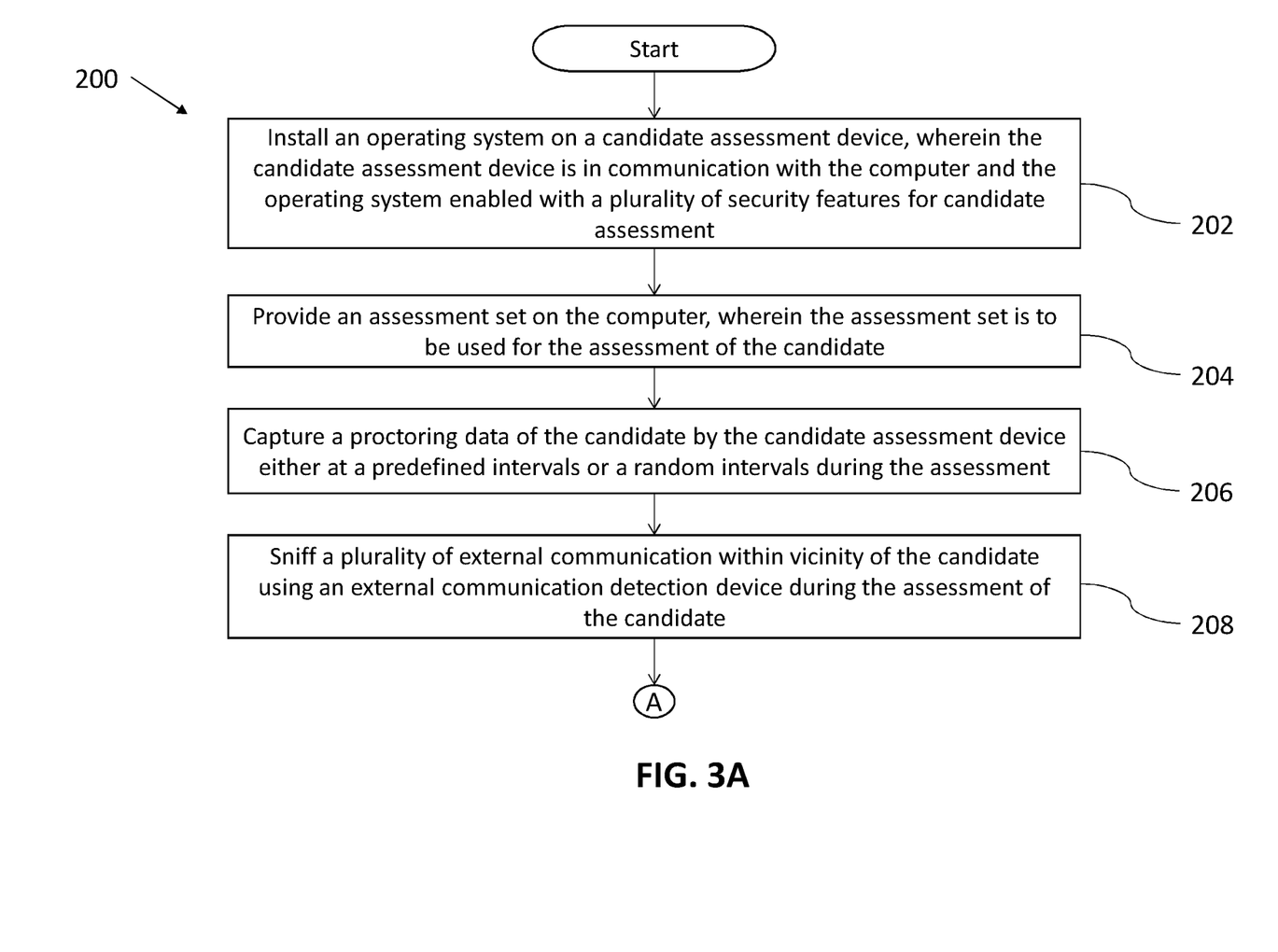
FIG. 3A-3B is a flowchart illustrating the steps involved in conducting a secure computer based assessment of candidates at an examination center according to an embodiment of the present disclosure.
Figure 3B:
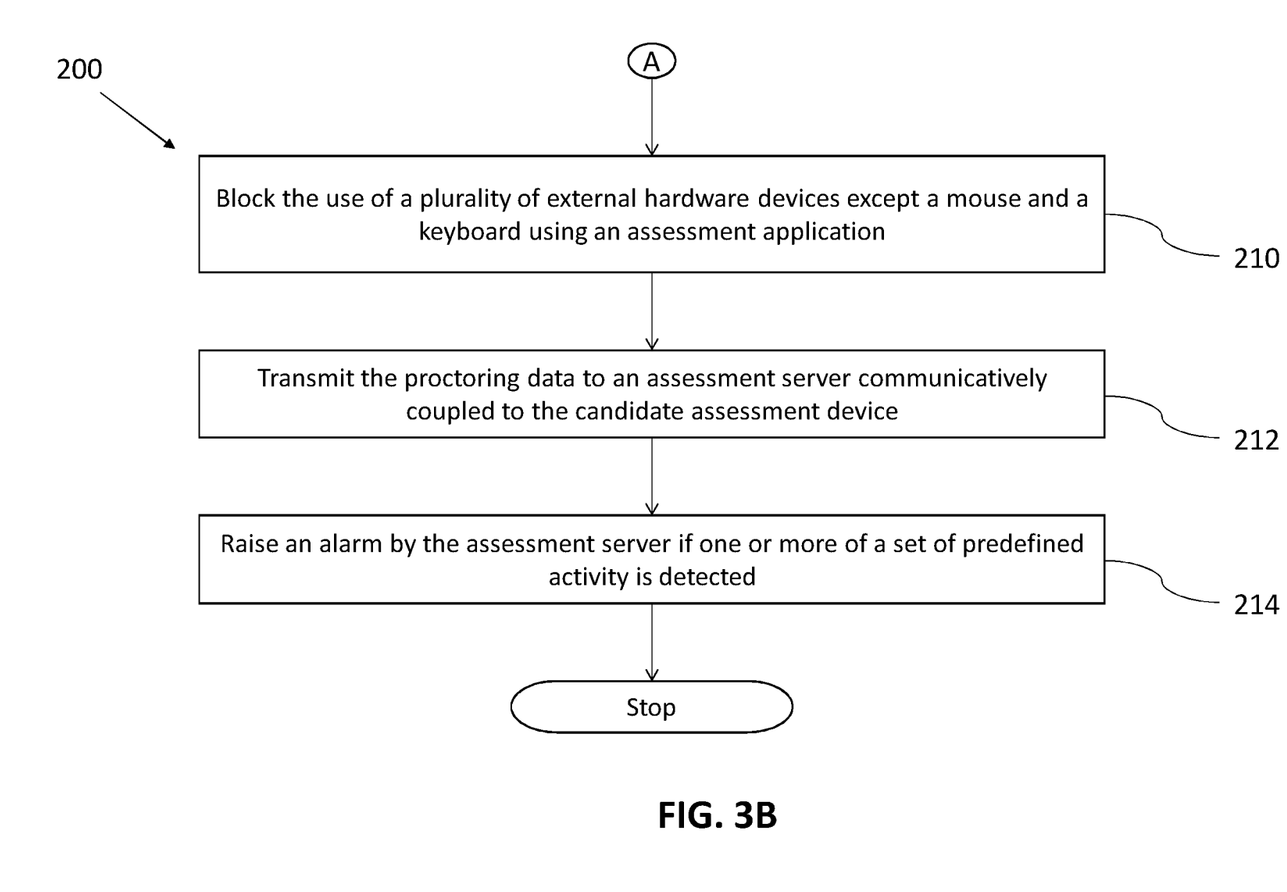

In operation, a flowchart 200 illustrating the steps involved for conducting a computer based candidate assessment as shown in FIG. 3A-3B. Initially, at step 202, the operating system is installed on the candidate assessment device 106. In an example, "iLEON OS" have been used, though the use of any other operating system is well within the scope of this disclosure. The operating system enabled with a plurality of security features for candidate assessment. At step 204, the assessment set is provided on the computer 102. The assessment set is to be used for the assessment of the candidate. The assessment set may include different types of question set such as optional, multiple choice, comprehension, fill in the blanks, match the columns and programming test containing text, images, audio, video content. At the next step 206, as soon as the candidate starts the assessment, the proctoring data of the candidate is captured by the candidate assessment device 106 at a predefined intervals. In another example the interval can be a random interval. The candidate assessment device 106 is in communication with the computer 102.

In the further few steps various security features are implemented to enhance the security and integrity of assessment of the candidate. At step 208, a plurality of external communication is sniffed within vicinity of the candidate using an external communication detection device 108 during the assessment of the candidate. In the present embodiment, a Wi-Fi signal, a radiofrequency/mobile communication and a Bluetooth signal is detected using the external communication detection device 108. At step 210, the use of the plurality of external hardware devices except a mouse and a keyboard are blocked using the assessment application.

In the next step 212, the proctoring data is transmitted to the assessment server 110. The assessment server 110 is communicatively coupled to the candidate assessment device 106. The assessment server 110 may be either present locally connected with one examination center or may be present centrally connected with more than one examination centers. And finally at step 214, the alarm 112 is raised by the assessment server 110 if one or more of a set of predefined activity is detected.

According to an embodiment of the disclosure, the assessment server 110 is also provided with a white listing feature that enables, only the candidate assessment devices 106, to connect to Wi-Fi or WLAN connected to the assessment server 110. Hence, in case a candidate assessment device is lost or stolen, it would be of no use to any one as the lost or stolen devices do not work and would be blocked by the assessment server 110. Thus, no one would be able to hack and get access to the network of the assessment server 110.

According to another embodiment of the disclosure, the assessment can be performed on the candidate assessment devices 106 itself instead of the computer. The candidate assessment device 106 may be a computing device, such as a hand-held device such as tablet, mobile phones, PDAs, Smartphone, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a system and method for conducting a secure computer based examination. The system performs a hassle free and unified experience in digital assessment of the candidate.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:
1. A method for conducting a computer based candidate assessment, the method comprising a processor implemented steps of:
   installing an operating system on a candidate assessment device, wherein the candidate assessment device is in communication with the computer and the operating system enabled with a plurality of security features for candidate assessment;

providing an assessment set on the computer, wherein the assessment set is to be used for the assessment of the candidate;

capturing a proctoring data of the candidate by the candidate assessment device at either predefined intervals or random intervals during the assessment;

sniffing a plurality of external communication within vicinity of the candidate using an external communication detection device during the assessment of the candidate;

blocking the use of a plurality of external hardware devices except a mouse and a keyboard using an assessment application;

transmitting the proctoring data to an assessment server communicatively coupled to the candidate assessment device; and raising an alarm by the assessment server if one or more of a set of predefined activity is detected.

2. The method of claim 1, wherein the set of predefined activity comprises:

at least one of an external communication out of the plurality of external communications within vicinity of the candidate, unusual behavior of the candidate as detected by the assessment application, presence of additional hardware connected to the computer, or improper matching of the proctoring data with an initial registration data, wherein the initial registration data is the data of the candidate captured before the start of the assessment.

3. The method of claim 1, wherein the assessment server is one of a central assessment server or a local assessment server.

4. The method of claim 1, wherein the plurality of security features comprises:

disabling HDMI and VGA projection in the computer;
disabling installation of a software in the computer;
preventing the operating system to become a virtual machine; and
supporting the data rebooting.

5. The method of claim 1, wherein the proctoring data comprises one or more of biometric data, still images, video, and surround sound associated with the candidate.

6. The method of claim 1, wherein the operating system is customizable using Linux.

7. The method of claim 1, wherein the capturing of the proctoring data is performed at one of beginning of the assessment, at a check-out for breaks, at check-in for breaks, and the end of the examination, by capturing at least one of a finger print, a thumb print, a palm print and a retinal scan of the candidate.

8. The method of claim 1, wherein the assessment set comprises one or more of optional type question, multiple choice question, comprehension, fill in the blanks, match the columns or programming test containing text, images, audio or video content.

9. The method of claim 1 further comprises the step of authenticating the identity of the candidate during registration of the candidate by comparing the captured biometric data and the Unique Identification Authority of India (UIDAI) data of the candidate.

10. The method of claim 1 further comprises the step of performing comparison of captured image with the image present in the UIDAI Image of the candidate.

11. The method of claim 1, wherein the external communication detection device is configured to perform radiofrequency/mobile communication detection, a Bluetooth signal detection and a Wi-Fi communication detection.

12. A system for conducting a candidate assessment, the system comprises:

a computer to be used by the candidate for the assessment;

an operating system installed on the computer, wherein the operating system enabled with a plurality of security features for candidate assessment;

an input/output interface for providing an assessment set on the computer, wherein the assessment set is to be used for the assessment of the candidate;

a candidate assessment device in communication with the computer, wherein the candidate assessment device is configured to:

capture a proctoring data of the candidate either at predefined intervals or random intervals;

an external communication detection device sniffing a plurality of external communication within vicinity of the candidate during the assessment of the candidate;

a blocking module present in the computer, wherein the blocking module is configured to block the use of a plurality of external hardware devices except a mouse and a keyboard using an assessment application;

an assessment server communicatively coupled to the candidate assessment device, wherein the assessment server is configured to receive the proctoring data of the candidate; and an alarm in communication with the assessment server, wherein the alarm is raised if one or more of a predefined activity is detected.

13. The system of claim 12, wherein the assessment server is one of a central assessment server or a local assessment server.

14. The system of claim 12, wherein the external communication detection device is one or more of a radiofrequency/mobile communication detection device, a Bluetooth signal detection device and a Wi-Fi communication detection device.

15. A non-transitory computer readable medium storing one or more instructions which when executed by a processor on a system, cause the processor to perform a method for conducting a computer based candidate assessment comprising:

installing an operating system on a candidate assessment device, wherein the candidate assessment device is in communication with the computer and the operating system enabled with a plurality of security features for candidate assessment;

providing an assessment set on the computer, wherein the assessment set is to be used for the assessment of the candidate;

capturing a proctoring data of the candidate by the candidate assessment device at either predefined intervals or random intervals during the assessment;

sniffing a plurality of external communication within vicinity of the candidate using an external communication detection device during the assessment of the candidate;

blocking the use of a plurality of external hardware devices except a mouse and a keyboard using an assessment application;

transmitting the proctoring data to an assessment server communicatively coupled to the candidate assessment device; and raising an alarm by the assessment server if one or more of a set of predefined activity is detected.

* * * * *